United States Patent
Moustakas (10) Patent No.: US 11,455,643 B2
(45) Date of Patent: Sep. 27, 2022

(54) BLOCKCHAIN WITH TRANSACTION CANCELLATION

(71) Applicant: Koninklijke KPN N.V., Rotterdam (NL)

(72) Inventor: Nikos Moustakas, Nootdorp (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 231 days.

(21) Appl. No.: 16/753,203

(22) PCT Filed: Oct. 4, 2018

(86) PCT No.: PCT/EP2018/076954
§ 371 (c)(1),
(2) Date: Apr. 2, 2020

(87) PCT Pub. No.: WO2019/072670
PCT Pub. Date: Apr. 18, 2019

(65) Prior Publication Data
US 2020/0258085 A1 Aug. 13, 2020

(30) Foreign Application Priority Data
Oct. 9, 2017 (EP) .................................. 17195368

(51) Int. Cl.
*G06Q 20/40* (2012.01)
*G06Q 20/06* (2012.01)
(Continued)

(52) U.S. Cl.
CPC ......... *G06Q 20/407* (2013.01); *G06Q 20/065* (2013.01); *G06Q 20/3825* (2013.01);
(Continued)

(58) Field of Classification Search
None
See application file for complete search history.

(56) References Cited

U.S. PATENT DOCUMENTS 9,774,578 B1 * 9/2017 Ateniese ............... H04L 9/0643
9,785,369 B1 * 10/2017 Ateniese ................ H04L 9/30
(Continued)

FOREIGN PATENT DOCUMENTS

CN 105 488 675 A 4/2016
EP 3 499 789 A1 6/2019
(Continued)

OTHER PUBLICATIONS

Antonopoulos, "Mastering Bitcoin," O'Reilly Media, Inc., all pages. (Year: 2014).*
(Continued)

*Primary Examiner* — Jacob C. Coppola
(74) *Attorney, Agent, or Firm* — Hamilton, Brook, Smith & Reynolds, P.C.

(57) ABSTRACT

Some embodiments are directed to a blockchain management no device (100) configured to apply a symmetric hash function over multiple transactions received over the communication interface thus obtaining a hash value, and to generate a consensus proof over at least the hash value, and to assemble a new block (240) for inclusion in the blockchain.

10 Claims, 6 Drawing Sheets

(51) Int. Cl.
*G06Q 20/38* (2012.01)
*H04L 9/06* (2006.01)
*H04L 9/30* (2006.01)

(52) U.S. Cl.
CPC ..... *G06Q 20/3827* (2013.01); *G06Q 20/3829* (2013.01); *H04L 9/0643* (2013.01); *H04L 9/30* (2013.01); *G06Q 2220/00* (2013.01)

(56) References Cited

U.S. PATENT DOCUMENTS

| | | | |
|---|---|---|---|
| 9,967,088 B2* | 5/2018 | Ateniese | ............... G06F 3/0659 |
| 10,305,833 B1 | 5/2019 | Dennis | |
| 10,554,649 B1 | 2/2020 | Fields | |
| 11,139,979 B2 | 10/2021 | van de Ruit | |
| 2016/0028552 A1 | 1/2016 | Spanos et al. | |
| 2016/0330034 A1 | 11/2016 | Back et al. | |
| 2017/0005804 A1 | 1/2017 | Zinder | |
| 2017/0031676 A1 | 2/2017 | Cecchetti et al. | |
| 2017/0046698 A1 | 2/2017 | Haldenby | |
| 2017/0075938 A1* | 3/2017 | Black | ................... H04L 9/3239 |
| 2017/0116693 A1 | 4/2017 | Rae | |
| 2017/0163733 A1 | 6/2017 | Grefen et al. | |
| 2017/0230189 A1 | 8/2017 | Toll et al. | |
| 2017/0295157 A1 | 10/2017 | Chavez et al. | |
| 2017/0323294 A1 | 11/2017 | Rohlfing | |
| 2017/0331896 A1 | 11/2017 | Holloway et al. | |
| 2017/0344988 A1 | 11/2017 | Cusden | |
| 2018/0089436 A1 | 3/2018 | Smith et al. | |
| 2019/0026821 A1 | 1/2019 | Bathen et al. | |
| 2019/0058719 A1 | 2/2019 | Kar | |
| 2019/0130387 A1 | 5/2019 | Arora et al. | |
| 2019/0190719 A1 | 6/2019 | van de Ruit et al. | |
| 2020/0389294 A1 | 12/2020 | Soundararajan | |
| 2021/0203476 A1 | 7/2021 | Van De Ruit et al. | |

FOREIGN PATENT DOCUMENTS

| | | |
|---|---|---|
| WO | WO 2019/072670 A1 | 4/2019 |
| WO | WO 2019/077126 A1 | 4/2019 |

OTHER PUBLICATIONS

Solidity Documentation Release 0.4.19, Ethereum (Dec. 2017).
Adam Back, et al., "Enabling Blockchain Innovations with Pegged Sidechains," (Oct. 22, 2014).
Tschorsch, F., et al., "Bitcoin and Beyond: A Technical Survey on Decentralized Digital Currencies," International Association for Cryptologic Research, vol. 20150517:090557, May 15, 2015.
International Search Report and Written Opinion for Int'l Application No. PCT/EP2018/076954, titled: Blockchain With Transaction Cancellation, dated Oct. 30, 2018.
European Search Report for European Application No. 17 195 368.0, Titled: Blockchain With Transaction Cancellation, dated Dec. 7, 2017.
Ateniese, G. et al., "Redactable Blockchain—or—Rewriting History in Bitcoin and Friends," 2017 IEEE European Symposium on Security and Privacy, IEEE, pp. 111-126 (Apr. 26, 2017).

* cited by examiner

BLOCKCHAIN WITH TRANSACTION CANCELLATION

This application is the U.S. National Stage of International Application No. PCT/EP2018/076954, filed on Oct. 4, 2018, which designates the U.S., published in English, and claims priority under 35 U.S.C. § 119 or 365(c) to European Application No. 17195368.0, filed on Oct. 9, 2017. The entire teachings of the above applications are incorporated herein by reference.

FIELD OF THE INVENTION

The invention relates to a blockchain management device, a blockchain verification device, a blockchain use device, a blockchain management method, a blockchain verification method, a blockchain use method, and a computer readable medium

BACKGROUND

Blockchains are a novel technology that allows distributed management of transactions while at the same time maintaining trust in those transactions. The latter may also be done in a distributed manner. A blockchain is list of records, which are called blocks, which are linked. Each block contains a pointer as a link to a previous block. Multiple parties can record transactions in the blockchain or verify previous transactions of others. The blockchain is sometimes referred to as a ledger.

An example of a known blockchain system is given in US Patent Application 20170031676, "Blockchain Computer Data Distribution" (included herein by reference). The known system discloses various uses of such blockchains. For example, blockchains are used in cryptocurrency systems. For example, cryptocurrency transactions for a period may be stored in a block that is then added to the tail of the blockchain, thereby extending the blockchain. The history of the cryptocurrency can be accessed by moving along the blocks of the blockchain. The blockchain could be held privately, e.g., in a centralized manner, or held publicly in a less centralized manner. The latter is usual for cryptocurrencies.

Another example, is the distribution of patches to IoT devices through a blockchain environment. In the blockchain environment, blocks, which can hold data, are chained together by storing information in a block which indicates the preceding block. A block can further comprise timestamp information and validation information.

One of the typical aspects of known blockchains is the immutability of the data. For example, once the data has been entered in the blockchain it can never be changed or tampered with. This provides security and integrity protection because if a hacker managed to alter the contents of a transaction the rest of the network would reject it. For example, if every new block contains the hash code of the previous block as input, changes would be visible due to an inconsistency of the hash codes in the chain.

The known blockchains are prevented from unauthorized adding of a block to the chain. The latter may be done by including a consensus proof in the block. For example, known consensus proofs, e.g., require that a majority of blockchain nodes confirm that a new block is valid before it is added to the blockchain. For example, a consensus proof may comprise a proof of work, etc. Once recorded, the data in any given block cannot be altered retroactively without the alteration of all subsequent blocks, which needs a collusion of the network majority.

SUMMARY OF THE INVENTION

As said, a typical property of blockchains is that the information recorded in it is immutable, and can never be changed. But there are cases where the parties involved in a transaction would like to cancel the transaction. In conventional systems this is not possible, since blocks are immutable. A blockchain management device is provided as defined in the claims. The blockchain management device allows safe cancelling of a blockchain transaction without harming the chain of digital signatures which form the blockchain.

The blockchain management device computes a consensus proof over a hash value that has been computed with a symmetric hash function. The resulting block can be modified but only to the extent that the change is not registered in the symmetric hash. Symmetric hashes are a new way of constructing the digital identity of a block, which allows users of the blockchain to cancel transactions which have already occurred.

Interestingly, the proposed blockchain provides the usual guarantees, e.g., public verifiability by using the blockchain framework, however with the proposed device cancelling, e.g., making void, of transactions in a blockchain is possible, while keeping the mechanics of the hash chain between the blocks intact. In an embodiment, a cancellation is allowed to cancel previous transactions, by replacing a prior block by a replacement block. The replacement block uses the same consensus proof, but through the ordering it is indicated that one or more of its transactions are cancelled.

In an embodiment, the cancellation is recorded by replacing a block of the blockchain, but also in a later block of the blockchain. This improves the possibilities to later verify that the replacement of the block on the blockchain was correct.

An aspect of the invention concerns a blockchain verification device as defined in the claims. The blockchain verification device validates a blockchain, and in particular cancellations that have occurred on the blockchain. For example, one problem that might occur, and can be identified by the blockchain verification device, is a replaced block, e.g., as visible from its ordering, and a later cancellation transaction which is absent or does not match. In this case, the replaced block may be discarded, so that the integrity of the blockchain is restored. Alternatively, the replacement block may be kept in a cache, in case a corresponding cancellation transaction is received later.

An aspect of the invention concerns a blockchain use device arranged to receive a transaction and obtain part of a blockchain, e.g., a block thereof, to verify the transaction.

The blockchain management, verification and use devices are electronic devices. For example, they may be a mobile electronic device, in particular the blockchain use device may be a mobile phone. The blockchain management, verification and use devices may, e.g., be a set-top box, computer, etc.

The methods for blockchains described herein may be applied in a wide range of practical applications. Such practical applications include: crypto currencies, transfer systems such as digital notaries implemented on a blockchain, domain management using blockchains, etc. The invention may also be applied in situation in which no transfer is done. For example, in data recording applications, e.g., for recording sensor values and the like, the invention can be used to cancel an erroneous sensor reading. In embodiments of the latter kind there is only one party involved in the cancellation.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a blockchain system including a blockchain management device, FIG. 2a schematically shows an example of an embodiment of a blockchain, FIG. 2b schematically shows an example of an embodiment of a replacement block, FIG. 2c schematically shows an example of an embodiment of a replacement block, FIG. 2d schematically shows an example of an embodiment of multiple transactions FIGS. 3a, 3b, 3c and 3d schematically show an example of an embodiment of multiple transactions, FIG. 4 schematically shows an example of an embodiment of a transaction, FIG. 5a schematically shows an example of an embodiment of a blockchain verification device FIG. 5b schematically shows an example of an embodiment of a blockchain use device FIG. 6a schematically shows an example of an embodiment of a blockchain management method, FIG. 6b schematically shows an example of an embodiment of a blockchain verification method, FIG. 6c schematically shows an example of an embodiment of a blockchain use method, FIG. 7a schematically shows a computer readable medium having a writable part comprising a computer program according to an embodiment, FIG. 7b schematically shows a representation of a processor system according to an embodiment.

LIST OF REFERENCE NUMERALS IN FIGS. 1-5b, 7a-7b 100 a blockchain management device
110 a communication interface
120 block constructor
125 a cancellation unit
130 consensus prover
140 a symmetric hash unit
150 a computer network
151, 152 blockchain use devices
160 a further blockchain management device
170 a blockchain verification device
180 a blockchain system
200 a blockchain
210, 220, 230 a block
211-251 a reference to a preceding block
212-252 multiple transactions
213-253 a consensus proof
214-254 a revision number
240 a new block
250, 250' a replacement block
253.1 a consensus proof
253.2 a further consensus proof
261,262 a transaction
271 a cancellation transaction
281 a dummy transaction
310 multiple transactions
311-313 a transaction
390 dummy transaction(s)
391-393 a dummy transaction
400 a blockchain use device
410 a communication interface
420 block obtainer
430 transaction verifier
450 a transaction
460 a transaction input
470 a transaction output
500 a blockchain verification device
510 a communication interface
520 a verification unit
525 cancellation verifying unit
570 a blockchain storage
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1:
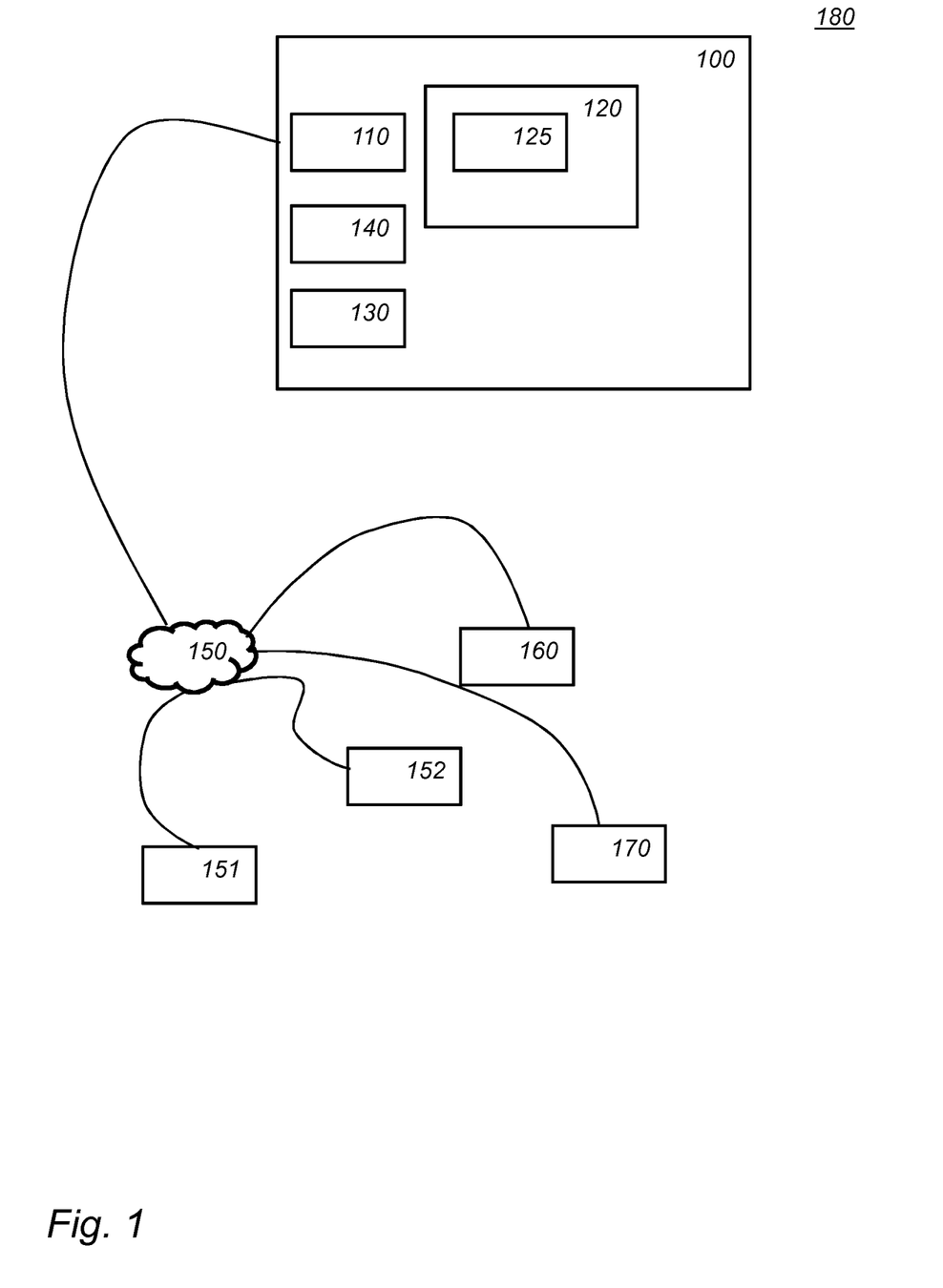

FIG. 1 schematically shows an example of an embodiment of a blockchain system 180. The system may include various different entities. Included in system 180 may be one or more blockchain management devices; shown are blockchain management devices 100, and 160, which is arranged to add one or more blocks to the blockchain. There may more than two blockchain management devices.

Included in system 180 may further be one or more blockchain use devices. Shown in FIG. 1 is blockchain use device 150 and blockchain use device 151. The blockchain use devices use the blockchain for some purpose, and may, e.g., generate transactions for inclusion in a future block of the blockchain, or may obtain part of the blockchain to at least partially verify a previous transaction. For example, if the blockchain is used for a cryptocurrency, a blockchain use device may verify that a particular transaction is valid and/or transfer or receive some amount of the crypto currency. There may be more or less blockchain use devices than shown in FIG. 1. An example, of a blockchain use device 400 which may be, e.g., employed in system 180 is further disclosed below. The computer network 150 may be a peer-to-peer network. For example, messages in system 180 may be sent to part of the devices in system 180, who then forward the message to further devices of system 180. Peer to peer networking may increase the resiliency of the computer network, but it is not necessary. For example, the devices, e.g., the block management device, may be programmed with computer network address of the other devices in the system, e.g., of the other blockchain management devices.

System 180 may comprise one or more blockchain verification devices. A blockchain verification device verifies at least part of the blockchain. There may be more or fewer blockchain verification devices than shown in FIG. 1. An example, of a blockchain verification device 500 which may, e.g., be employed in system 180 is further disclosed below.

Some or all of the devices of system 180 may be integrated. For example, a blockchain verification device may be separate from a blockchain management device, e.g., to distribute these functions over different computers which may even be distributed geographically. However, a blockchain verification device may also advantageously be integrated with a blockchain management device. A blockchain verification device may also be integrated in a blockchain use device, e.g., to perform a more extensive verification at the use device.

A blockchain management device may also be integrated with a blockchain use device. In this case, the device that produces transactions may also be capable of processing such transactions. This has the advantage that blockchain management, e.g., of generating a new block is distributed over more devices.

The various devices of system 180 communicate with each other over a computer network 150. The computer network may be an internet, an intranet, a LAN, a WLAN, etc. Computer network 150 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 180 as needed. For example, the connection interface may comprise a connector, e.g., a wired connector, e.g., an Ethernet connector, or a wireless connector, e.g., an antenna, e.g., a Wi-Fi, 4G or 5G antenna. For example, blockchain management device 100, blockchain verification device 500 and blockchain use device 400 may comprise communication interface 110, 510 and 410 respectively. Computer network 150 may comprise additional elements, which are not separately shown in FIG. 1, e.g., a router, a hub, etc. In blockchain management device 100, the communication interface 110 may be used to receive transactions for recording in a blockchain. Transactions may be digital transactions, e.g., received in electronic form.

A blockchain management device, such as blockchain management device 100, may comprise a block constructor 120, an optional cancellation unit 125, a consensus prover 130 and a symmetric hash unit 140.

An interesting property of blockchain management device 100 is that the blocks that it creates allow a certain amount of modification, which may be used to cancel transactions. Without the optional cancellation unit 125, the blockchain management device 100 is capable of generating blocks which allow a certain degree of modification, but may not support cancellation itself. With cancellation unit 125, blockchain management device 100 accepts cancellation requests and can execute them.

Conventional blockchain systems only support strict immutability of blocks. However, there are cases where the two or more parties involved in a transaction would like to cancel it. Introducing the option of some restricted mutability in a block, allows safe cancellation of a blockchain transaction without harming the chain of digital signatures which form the blockchain. At best, conventional methods allow a transaction to be reversed later; for example, if an amount of cryptocurrency is transferred, the parties may later decide to transfer it back. But this is something different, the initial transaction remains valid and on the blockchain. In the conventional systems, it is not possible to void a transaction as if it never happened. In an embodiment, devices can alter their blockchain to reflect the cancellation.

Figure 5A:
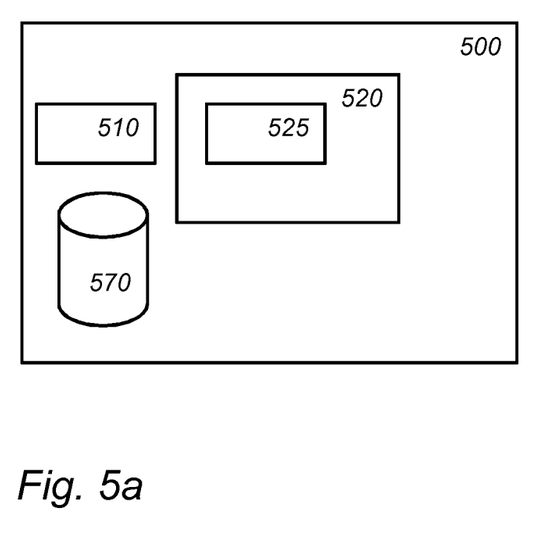
Figure 5B:
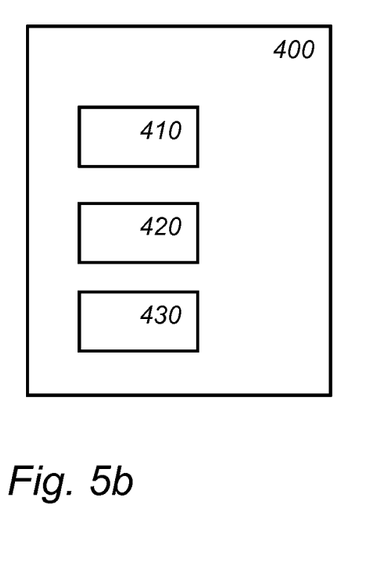

The execution of the blockchain management device 100, but also of, blockchain verification device 500, and blockchain use device 400 is implemented in a processor circuit, examples of which are shown herein. FIGS. 1, 5a and 5b show possible functional units that may be functional units of the processor circuit. For example, FIGS. 1, 5a and 5b may be used as a blueprint of a possible functional organization of the processor circuit. The processor circuit is not shown separate from the units in FIGS. 1, 5a and 5b. For example, the functional units shown in FIGS. 1, 5a and 5b may be wholly or partially implemented in computer instructions that are stored at device 100, 500 and 400, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on the device.

Block constructor 120 may be used to construct, e.g., compute, a new block of the blockchain. Over communication interface 110, transactions are received from other elements in system 180, e.g., from blockchain use devices 150 or 151. Block constructor 120 collects a multiple of the received transactions, e.g., it selects them. For example, block constructor 120 may select all transactions that are received in a period. For example, block constructor 120 may prioritize certain transactions, e.g., by type, by origin, etc. Block constructor 120 may also verify the validity of the transactions. For example, in an embodiment in which transactions are signed, block constructor 120 may verify the signatures, and, e.g., discard invalid transactions. Verification and/or selection may be offloaded to a verification device though.

In addition to collecting the multiple transactions, the block constructor 120 obtains other parts of the new block. A symmetric hash is computed over the multiple transactions, and a consensus proof is obtained over the symmetric hash value. The new block is then assembled from at least the multiple transactions, the consensus proof, and a reference to a preceding block on the blockchain. For example, the reference may be to a last block, e.g., the tail block, of the current blockchain. For example, the current blockchain may be stored on a storage of the blockchain management device, although this is not needed. The new block is then communicated to one or more other elements of system 180. The new block is distributed, e.g., to at least further blockchain management device 160. Optionally, a block may also include a revision number. If a new block is created the revision number would be set to an initial value, e.g., the initial value may be 0, e.g., a default value. If a block is replaced, the revision number would be increased to a next value, e.g., to 1, 2, etc. In an embodiment, the consensus proof is not computed over the revision number.

Symmetric hash unit 140 is arranged to compute a symmetric hash function over the multiple transactions which are to be included in the new block. A symmetric hash shares some of the properties of regular hashes, with an important difference: the symmetric hash function produces the same hash value if the multiple transactions are in a different order. In other words, if the multiple transactions are hashed twice, but re-arranged, e.g., permuted, the symmetric hash value will not change. Apart from this, the symmetric hash shares the usual properties of hash functions. For example, a symmetric hash has pre-image resistance as usual and second pre-image resistance in the following sense: Given a hash value h and a message m, any permutation of m will have the same hash function, it is however difficult to find any message m', which is not a permutation of m, that gives the same symmetric hash value. Likewise, it is resistant against collisions, in the sense that it is difficult to find two messages m and m', which are not permutations of each other, that give the same hash value. How difficult is enough depends on the application of the blockchain, e.g., on the value of the assets that are protected by the blockchain.

The inventor found that symmetric hashes can be constructed from conventional non-symmetric hashes. For example, conventional non-symmetric hashes which may be used include the SHA family, e.g., SHA-256. For example, a symmetric hash may be constructed by computing a non-symmetric hash function for each of the multiple transactions separately; thus, obtaining multiple hashes. Next a symmetric function is applied to the separate hashes. Many types of symmetric functions are known and include: XOR, symmetric polynomials in a finite field, addition in finite commutative group, etc. In particular, computing the XOR of the multiples hashes is a convenient way to compute the hash. Optionally, a further hash, e.g., a conventional hash may be computed over the result of the symmetric function. For example, assuming there are three transactions $x_i$, and a conventional, e.g., non-symmetric, hash function h( ), one may compute $h(h(x_1) \oplus h(x_2) \oplus h(x_3))$. Note that this construction has the property that any other ordering of the $x_i$ would give the same hash value, but that other properties of hash function h are not impacted. As discussed below, the symmetric hash function may be used to allow a limited degree of mutability in a block, e.g., because permutations do not affect the block hash, but other changes, in particular changing, removing or adding transactions would.

Consensus prover 130 is arranged to generate a consensus proof over at least the symmetric hash value. Because the hash value is computed by a symmetric hash function, the consensus proof remains valid if the order of the transactions changes. This is different in conventional blockchains, in which a consensus proof loses its validity after any change to the transactions, including any change to the order of the transactions. Any of the known consensus proofs may be adapted for an embodiment, for example, the consensus proof may comprise a proof of work. For example, the consensus proof may comprise a string x so that a hash function computed over string x and the symmetric hash s, e.g., h(x|s), has a particular form, e.g., is below some difficulty target; the hash may be a non-symmetric hash. For example, the consensus proof may comprise consensus from some portion of the network, e.g., it may comprise signatures of one or more further blockchain management devices. For example, consensus prover 130 may be arranged to obtain said digital signatures from the other blockchain management devices over the digital network. For example, the consensus proof may be required to comprise a signature of at least 51% or more of the blockchain management devices. Such signatures may be obtained over the computer network 150.

Once the block is completed it may be distributed over system 180, e.g., in a peer to peer fashion. Other blockchain management or verification devices may verify the block and include it in their blockchain. Once new blocks are added to the blockchain which refer to the new block, the trust in the new block is increased, as it becomes increasingly harder to replace the new block with another block. However, even if the new block becomes ingrained in the blockchain and ever harder to replace outright, there is a degree mutability built in because of the symmetric hash.

This mutability may be exploited to allow cancellation of transactions. For example, if the parties to a transaction agree to undo the transaction, this can be arranged by cancelling it. In an embodiment, blockchain management device 100 comprises cancellation unit 125. It is not necessary that all blockchain management devices are capable executing cancellations, so long as the other devices in system 180 recognize a cancellation after it occurred.

Cancellation unit 125 is arranged to determine that a transaction received over communication interface 110 is a cancellation request which requests cancellation of a transaction recorded in a block of the blockchain. For example, a cancellation request may be received from a blockchain use device. For example, a cancellation request may be recognized by its header, a particular number, particular formatting and the like. The cancellation request refers to a transaction that has already been recorded in a previous block. To cancel a transaction that is not yet recorded in a block, the transaction which is to be cancelled can simply be discarded and not included in a new block. Cancellation unit 125 is arranged to determine from the cancellation request a prior block on the blockchain which comprises the transaction which is to be cancelled. For example, the prior block may be identified in the cancellation request by a block identifier, e.g., number, the transaction may be referred to by a number, an id, a position in the block, its hash, etc. For example, the cancellation request may comprise an id of a cancelled block, e.g., a revision number.

The referred block can be the previous block, but this is not necessary, the referred to block can be further in the past. Cancellation unit 125 is arranged to generate from the prior block a replacement block. The replacement block may comprise a reference to the same previous block as the prior block which it replaces.

Parts of the prior block can be re-used for the replacement block. For example, the replacement block comprises the same consensus proof as the prior block. The replacement block also comprises the same multiple transactions as the prior block. However, the ordering of the multiple transactions in the replacement block is changed by cancellation unit 125 to indicate the cancellation of the transaction identified in the cancellation request. The replacement block may contain an increased revision number. There are several ways in which the ordering in the replacement block can indicate a cancellation, as will be further disclosed below. The replacement block is distributed to system 180, e.g., over network 150; for example, the replacement block is distributed to the at least one further blockchain management device over the communication interface. In an embodiment, the replacement block is distributed together with the new block.

In an embodiment, cancellation unit 125 is arranged to include in the new block a cancellation transaction which indicates the replacement of the prior block with the replacement block. This records on the blockchain that a modification of a past block of the blockchain occurred. For example, the cancellation transaction may indicate which transaction was cancelled in the previous block. In an embodiment, the cancellation transaction in the new block comprises a hash of the replacement block. The latter is a regular, non-symmetric hash over the replacement block (or part thereof), and not a symmetric hash. So, said hash value would change when transactions are reordered. By including this hash in the cancellation transaction, the regular consensus mechanism is used to build trust in the cancellation. The more often the new block is confirmed when further blocks are added to the blockchain, the more often the cancellation request is confirmed, and the more often the replacement block is. This feature also resolves races, that may occur if two blockchain management devices cancel the same block at the same time. Even if parts of system 180 may adopt one version of the replacement block while another part adopts another version, in time this will be resolved, e.g., using the longest chain rule.

In blockchains the longest chain rule allows nodes, e.g., blockchain management devices to resolve races. It may happen that two blockchain management devices add a block to the blockchain independent from each other. The blockchain thus splits, becoming in essence a block tree. It may even happen that yet further blocks are added, or even further splits. The longest chain rule prescribes which of the blocks become the new blockchain: the active chain is the longest path from the genesis block to a leaf node, e.g., a block at the bottom of the block tree. This chain represents the most accumulated consensus, e.g., the most work. The consensus mechanism makes sure that the chance that two nodes disagree about blocks in the past decreases as the blocks are older. For example, when a new block arrives, and it extends the previous active chain, a blockchain management device may append it to the active chain. If it does not extend the previous active chain, it depends on whether the branch it does extend has more consensus, e.g., more work, e.g., more blocks, than the currently active chain. If not, the block is stored but the current chain is kept active. If it does have more work, a so-called reorganization is done: deactivating blocks from the old branch, and activating blocks from the new branch.

For example, consider two parties: Bob and Alice, who make a transaction. The transaction is included in a block as Tx1. One day later both Alice and Bob want to cancel the transaction. They produce a new block, with revision number 2 and they put the transaction to the last position. We assume in this example that moving a transaction to the last position, means that the transaction becomes void. A consensus proof is computed over the XOR of the hashes of the transactions. The header of the replacement block may remain the same since the XOR result is the same. In XOR calculations the position of inputs does not make any difference. In order for Alice and Bob to prove that they are the parties involved in this transaction, and are thus allowed to cancel it, they could sign the new transaction, or new transaction list, with their private keys. The miners, e.g., the blockchain management devices, may check if the transaction cancellation request is valid and may check if the balance of the parties allows them to cancel the transaction. If both checks are true then the revised block is added to the chain, the old version block is removed and the digital signature of Alice and Bob proving the authenticity of the cancellation is added as transaction in the current block.

In an embodiment, each transaction must be signed by both parties, the ones who holds and gives the value and the one who receives it. The A party, e.g., the spender may provide a P2PKH (Pay To PubKey Hash) script allowing B party(receiver) to later spend the value. Both A and B may also provide a cancellation P2SH Multisig (2 for 2) signature where both parties will be needed later to cancel the transaction.

In an embodiment, an invalidation period is defined. For example, a blockchain management device may comprise a store, storing an invalidation period. A transaction can only be invalidated within a certain timeframe, e.g., within a day, a week, etc., from, say, a timestamp in the block in which the transaction is originally recorded. This has the advantage that as some point a block becomes immutable again. In particular the block may become completely immutable; for example, amending a block by changing the ordering of transactions is detected and disregarded as an illegal operation by the entities in the system, e.g., the blockchain management or verification devices, etc.

Figure 2A:
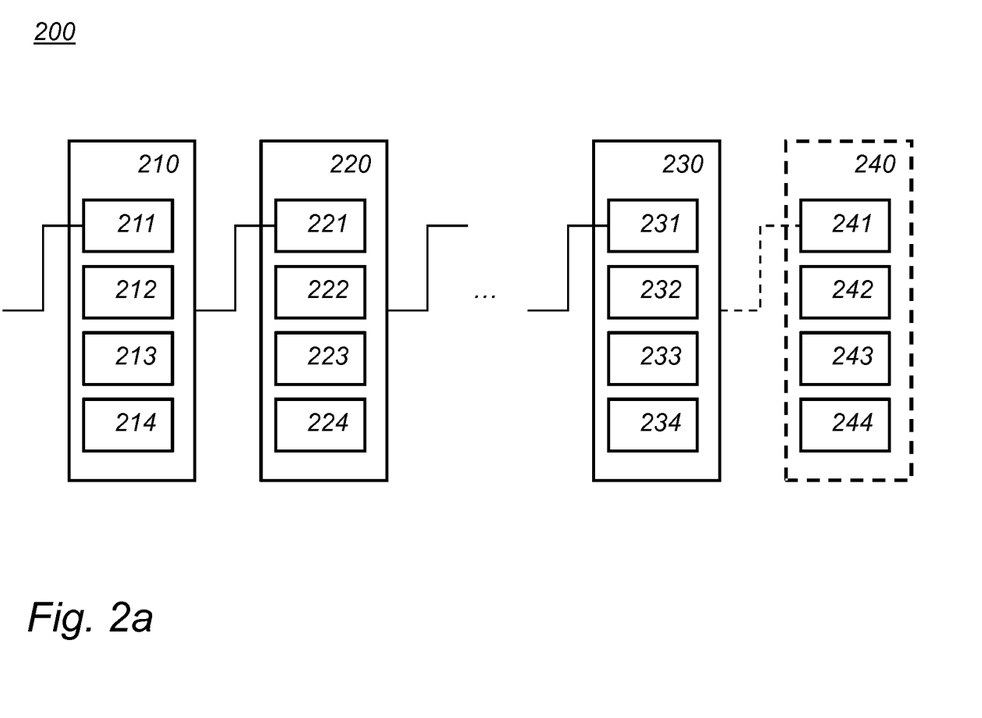

Various embodiments of blocks and blockchains which may be used in embodiments of system 180 are illustrated in FIGS. 2a-2d. FIG. 2a schematically shows an example of an embodiment of a blockchain 200. There have not yet been any cancellations in blockchain 200. Shown are blocks 210, 220 and 230, there may be more blocks. A blockchain management device, e.g., device 100, is in the process of generating a new block 240.

The blocks shown in FIG. 2a each comprise a reference to a preceding block. Shown are references 211, 221, 231, and 241. For example, the reference may comprise a block identifier of the previous block. In an embodiment, the reference may comprise a digital signature over the previous block or a hash, etc. The reference may comprise the consensus proof of the previous block; etc.

The block further comprises multiple transactions, shown are transactions 212, 222, 232, and 242. The transactions may be transactions on cryptocurrency but this is not needed. The transactions may be registrations of transfers, e.g., of domain names. They may register data, e.g., sensor values. Each of the blocks comprises a consensus proof.

Shown are consensus proofs 213, 223, 233, and 243. The consensus proofs are computed over a symmetric hash of the multiple transactions. For example, consensus proof 213 is computed over a symmetric hash of transactions 212, etc. The consensus proof may include other elements, e.g., an identifier of the block, e.g., the block height, e.g., other data, e.g., an identifier of the block management device that created it, etc. The block identifiers are not separately shown in FIG. 2a.

Each of the blocks may comprise a revision number. Shown are revision numbers 214, 224, 234, and 244. As there has not been cancellations yet, the revision number may be set to, say, 0. Revision numbers are a convenient but not a necessary way to refer to replacement blocks.

Assume now that the blockchain management devices that creates block 240 has received a cancellation request. Let's say the cancellation is for a transaction contained in block 220. The cancellation unit may then retrieve block 220, e.g., from its own storage or from some other device, e.g., from a verification device.

Figure 2B:
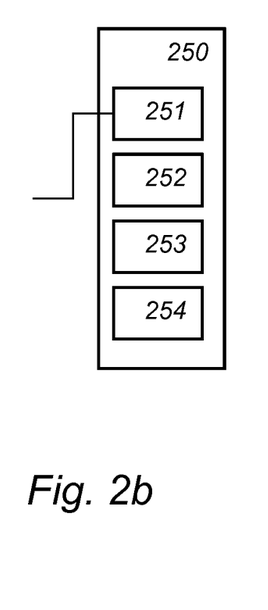

FIG. 2b schematically shows an example of an embodiment of a replacement block 250. Replacement block 250 is a replacement for prior block 220.

Replacement block 250 comprises a reference 251 to a previous block, which may be the same as reference 221. The reference may thus be included in the consensus proof. The Replacement block 250 comprises multiple transactions 252. Multiple transaction 252 are the same as multiple transactions 222 except for the order. The order indicates which of the multiple transactions is cancelled. Replacement block 250 comprises a consensus proof 253. The consensus proof is computed over data which is either the same as in block 220 (e.g., the block identifier, and/or the reference to the previous block) or the transactions. However, the latter are included only as a symmetric hash. As a result, consensus proof 253 may be the same as consensus proof 223; consensus proof 253 is a valid consensus proof over block 250 as well. Block 250 may comprise a revision number 254. Revision number is increased to the next revision number, e.g., to 1. The consensus proof 253 does not have to be computed over revision number 254. For example, in an embodiment, a consensus proof may be over a hash value such as h(s|m), in which s is a symmetric hash over the transaction, and m is other data, such as a block ID, an ID of the blockchain management device, and the like. In an example, a consensus proof may comprise a string x so that a hash, e.g., h(x|s|m), satisfies a difficulty target.

Replacement block 250 may be distributed together with new block 240. Included in the transactions of 242 of the new block may be a cancellation transaction which indicates that block 220 has been replaced by block 250. The cancellation transaction may include a non-symmetric identification of block 250, e.g., a digital signature or a hash computed over replacement block 250. This allows positive identification which block is correct. A block is correct if it is later referenced by a new block, e.g., using the longest chain rule. A cancellation block is correct if it is referenced in a cancellation transaction. Other ways of keeping track of the validity of blocks may be used.

Figure 2C:
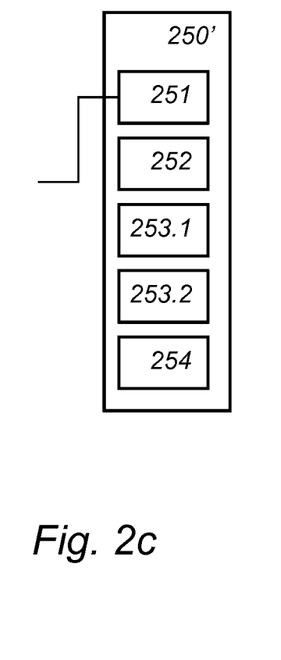

FIG. 2c schematically shows an example of an embodiment of a replacement block 250'. Replacement block 250' is similar to replacement block 250 except for the consensus proof. Replacement block 250' comprises a consensus proof 253.1 which is the same as the consensus proof 222. Replacement block 250' comprises a further consensus proof 253.2 which is computed by the blockchain management device when the replacement block is created. The consensus proof 253.2 need not be of the same type. For example, consensus proof 253.1 may be a proof of work consensus, whereas consensus proof 253.2 may use a less demanding proof, e.g., some required number of signatures of other blockchain management devices. Further consensus proof 253.2 may be computed over a regular non-symmetric hash, e.g., a hash over the transactions. The latter may be a percentage, say 51% or more of the network, but may also be a fixed number, say at least 2 or 3 signatures. The latter keeps cancellation computation-wise relatively easy while still requiring some consensus.

Figure 2D:
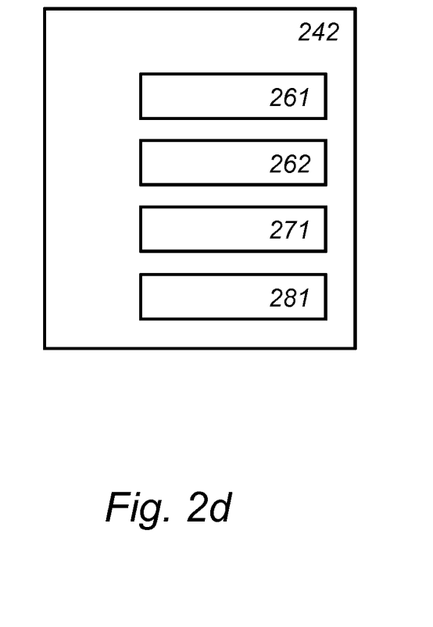

FIG. 2d schematically shows an example of an embodiment of multiple transactions 242. Shown in FIG. 2d are transactions 261 and 262. The latter may be regular transactions, e.g., they may be registrations, or transfers, etc. The multiple transactions may also comprise a dummy transaction 281. For example, the dummy transaction may transfer nothing, or transfer to the originating account. The dummy transaction may also be recognizable by its format, etc. A dummy transaction is helpful to indicate which transaction is cancelled, but it is not needed. Multiple transactions 242 also comprise a cancellation transaction which may indicate the replacement block 250, e.g., its hash, its block identifier (if any) and its revision number (if any).

Figure 3A:
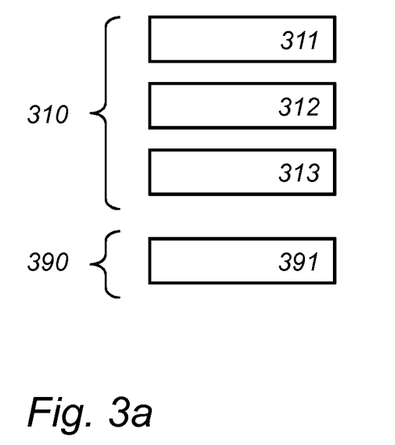
Figure 3B:
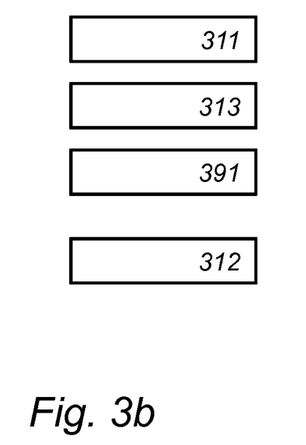

Indicating a canceled transaction using ordering can be done in various manners. In an embodiment, the multiple transactions comprise one or more one dummy transactions in addition to the transaction identified in the cancellation request. For example, transactions 222 may comprise: the transaction identified in the cancellation request, a dummy transaction, and possibly one or more additional transactions. FIG. 3a schematically shows an example of an embodiment of multiple transactions before cancellation. Shown are non-dummy transactions 310, comprising transactions 311, 312 and 313, and dummy transactions 390. Shown in FIG. 3a is a single dummy transaction 391. FIG. 3b schematically shows an example of an embodiment of the same multiple transactions after cancellation. In this embodiment, transactions that are ordered before the dummy transaction are not cancelled, whereas transactions that are ordered after the dummy transactions are cancelled. Since transaction 312 is before the dummy transaction 391 in FIG. 3a, it is not cancelled; Since transaction 312 is after the dummy transaction 391 in FIG. 3b, it is cancelled. Before and after are relative. These terms may be taken from the beginning of the block, or just as well from the end. For example, in an embodiment, one may reverse the rule and require that transactions before the dummy are cancelled, and after the dummy are not cancelled. Any ordering rule may be used, as long as the rule is the same for all devices in system 180 or can be uniquely determined from the block. The dummy transaction can be considered as a special pointer.

Figure 3C:
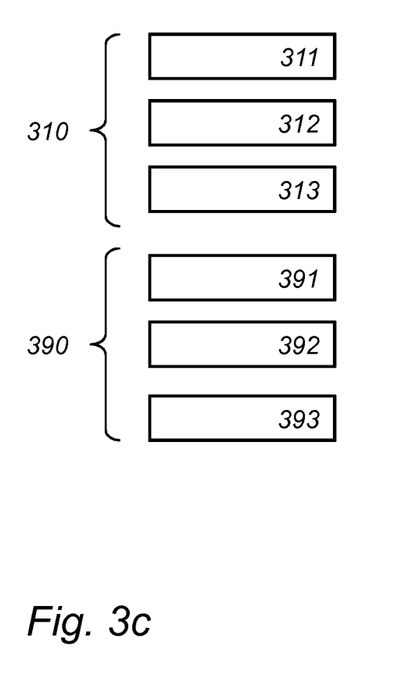
Figure 3D:
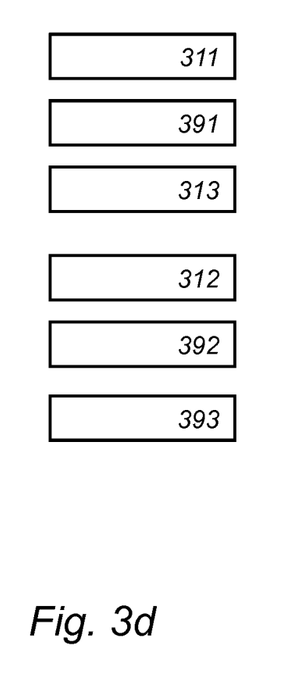

FIG. 3c schematically shows an example of an embodiment of multiple transactions. In this variant, the dummy transaction contains multiple dummy transactions. In this embodiment, a transaction is cancelled by switching its place with a dummy transaction. For example, FIG. 3d schematically shows an example of an embodiment of multiple transactions in which transaction 312 has been cancelled by switching its place with transaction 391. In this embodiment, the transaction that are not cancelled keep the same place in the block. The number of dummy transaction can be the same as the number of non-dummy transactions, but it can also be smaller.

In an embodiment, a cancelled transaction is identified by the ordering without a dummy transaction. For example, in an embodiment there are at least three transactions, say, a, b and c. The transactions have some natural order, for example, they may comprise a number, a transaction id, a time stamp or the like, which may be used as a sorting key. In the prior block before cancellation the transactions are included in a sorted order, e.g., as {a, b, c}. To cancel a transaction, it is removed from the list and appended at the end or at the beginning so that the list is no longer ordered. The new list of transaction will contain two lists the longer of which is sorted and not cancelled, the shorter of which is cancelled. For example, to cancel a, b and c respectively, the list may be reordered to {b, c, a}, {b, a, c} or {a, c, b}, and {c, a, b} respectively. Note that the sorted list of cancelled transaction can usually be placed either at the beginning or at end, but it should be avoided that the whole list becomes sorted. To cancel b and c from {a, b, c, d, e}, one may reorder to {a, d, e, b, c}. In this way up to $\lfloor n-1/2 \rfloor$ of the transactions can be cancelled without dummy transactions; n refers to the total number of transactions.

Figure 4:
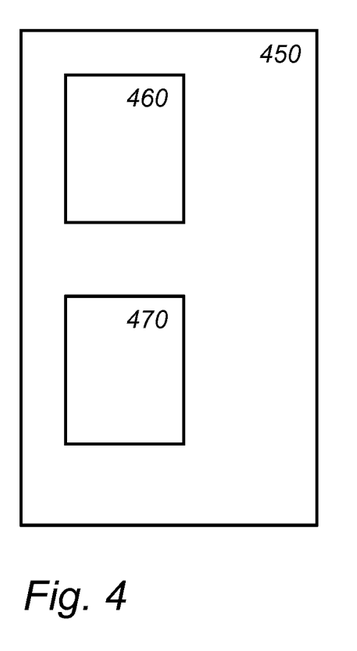

FIG. 4 schematically shows an example of an embodiment of a transaction 450. Transaction 450 comprises one or more transaction inputs, one of which is shown: transaction input 460 and one or more transaction outputs, one of which is shown: transaction output 470. Transaction input 460 may give an indication of the origin of the transfer, e.g., of the transferring party. Transaction input 460 may also contain the source of the object. Transaction output 470 contains the object of the transfer, e.g., the transferred to party. For example, in an embodiment of a cryptocurrency these may be as follows:

Transaction input 460 comprises as input a reference to an output from a previous transaction. Multiple transaction inputs may be listed in transaction 450. All of the transaction inputs, e.g., the total coin value of the previous outputs referenced by transaction 450 are added up, and the total (less any transaction fee) is completely used by the outputs of the transaction. For example, a previous transaction ('tx') may be referenced by the hash of a previous transaction. Transaction input 460 may comprise a first half of a script ('ScriptSig').

A script has two components: a first half ('ScriptSig') and a second half ('ScriptPubKey'). To verify that the transaction inputs are authorized to collect the values of the referenced outputs, the scriptSig(s) in the transaction inputs can be evaluated with the corresponding scriptPubKey from the corresponding previous transaction. For example, in an embodiment the scriptPubKey comprises the hash of a public key ('pubKeyHash'), whereas the scriptSig comprises the public key corresponding to the hash ('pubKey') and a signature created with it ('sig'). The latter proves that the transferring party had access to the corresponding private key, and is therefore authorized to further transfer it. The public key, private key and signatures may be ECDSA keys and signatures. The transaction outputs, e.g., transaction output 470, may comprise second halves of scripts ('ScriptPubKey'). A second half script binds the output to a particular party with access to the corresponding private key. There can be more than one output, and they share the combined value of the inputs.

In an embodiment, the processor circuit of the blockchain management device, e.g., the cancellation unit 125 is configured to verify the legality of the cancellation request according to a legality criterion. There are a number of legality criteria that may be taken into account, some of which may depend on the application. For example, in an embodiment the cancelled transaction, e.g., the transaction identified in the cancellation request has at least one transaction output such as transaction output 470. The legality criterion may comprise verifying that the transaction output does not correspond to a transaction input later in the blockchain. For example, in the context of a cryptocurrency, the legality criterion may comprise verifying that the currency transferred is not yet spent in a later transaction.

For example, in an embodiment, the cancelled transaction cancellation request comprises at least one transaction input 460 and least one transaction output 470. A public key corresponds to the at least one transaction input and to the at least one transaction output. For example, in the embodiment above, the transaction input may comprise a public key which thus corresponds with the transaction input. For example, the transaction output may comprise a public key hash, although it may also comprise a public key itself. The public key corresponding to the public key hash also corresponds to the transaction output.

In an embodiment, the cancellation request comprises one or more signatures for one or more of said public keys. In this case, the legality criterion comprises verifying the one or more signatures. In case, only a public key hash is available, then the cancellation request may comprise the public key as well. In an embodiment, a signature is required from both the input and output of the transaction. This may be taken as an indication that both parties agree to cancel the transaction. In other embodiments, only one of the signatures is needed to cancel the transaction. For example, in an embodiment, the cancellation transaction comprises two signatures, and the public key of the transaction output of the cancelled transaction.

In an embodiment, a cancellation request comprises input and two outputs. For example, the first output may be a so-called PaytoPubkey script and the second output may be the cancellation.

FIG. 5a schematically shows an example of an embodiment of a blockchain verification device 500. In addition to the communication interface 510, blockchain verification device 500 comprises a verification unit 520, a cancellation verifying unit 525 and a blockchain storage 570. The blockchain storage 570 comprises the current state of the blockchain. In an embodiment, blockchain verification device 500 is arranged with a blockchain browser. The blockchain browser providing a user interface for browsing the blockchain. The user interface may also receive a request to search for transactions, cancellations, and the like. In an embodiment, blockchain verification device 500 may be arranged to receive requests for part of the blockchain. For example, a blockchain use device may request blocks of the blockchain.

For example, blockchain verification device 500 may be configured to receive new blocks, e.g., from blockchain management devices, verify the blocks and store them in the blockchain storage 570. Blockchain verification device 500 may employ some tie-breaking rule in case multiple conflicting blocks are received. The tie breaking may be the so-called longest chain rule.

The verifying of verification unit 520 may comprise the conventional verification checking for blockchain: For example, verifying the consensus proof, verifying that first and second halves of transactions correctly execute, and so on. Verification unit 520 may also perform verification specific to cancelled transactions. For example, after receiving a block, cancellation verifying unit 525 may be arranged to identify a transaction in a block of the blockchain as cancelled, e.g., based on the ordering of multiple transactions in the block, e.g., in one of ways indicated herein, or by the revision number, etc. The block comprises a consensus proof, generated as indicated herein, e.g., over a symmetric hash value. The consensus prove may be verified.

After recognizing that a received block is a replacement block, and that it contains a cancelled transaction, the cancellation verifying unit 525 may search for and identifying a cancellation transaction in a further block of the blockchain. The further block should be later in the blockchain than the block comprising the cancelled transaction, e.g., having a higher block number, or having a greater distance to the genesis block For example, in an embodiment, replacement blocks are indicated in a block later in the blockchain, in the form of a cancellation transaction. The cancellation verifying unit 525 is determined to verify that the two belong together, e.g., that the cancellation transaction corresponds to the replacement block and/or to the cancelled transaction. If the latter determination is successful, the prior block in storage 570 may be replaced with the replacement block. The prior block may be kept if desired, e.g., in an archive.

In an embodiment, blockchain verification device 500 verifies that a replacement block that is received, is authentic by looking to a later cancellation transaction. In an embodiment, blockchain verification device 500 verifies also (or instead) that a regular, un-replaced block, does not have a later corresponding cancellation transaction.

The blockchain verification device 500 may also verify on the transaction level that all legality criteria are fulfilled. For example, blockchain verification device 500 may verify that transactions are not cancelled if the transferred object was already transferred, e.g., to a father party, e.g., in a transaction between the prior block and the new block.

FIG. 5b schematically shows an example of an embodiment of a blockchain use device 400. In addition to the communication interface 410, device 400 comprises a block obtainer 420, and a transaction verifier 430. Blockchain use device 400 may be configured to perform only minimal verification before accepting a transaction. For example, use device 400 may receive a transaction, e.g., from another blockchain use device. The transaction may comprise a transaction input referring to an earlier transaction. For example, the transaction transfers currency or some other goods to an account under control of the owner of the blockchain use device 400. Blockchain use device 400 is arranged to verify that the transaction input, e.g., to verify that the transaction is actually correct, and not, e.g., a double spending.

For example, block obtainer 420 may be configured to obtain a block from a blockchain comprising said earlier transaction, wherein the block comprises multiple transactions including the earlier transaction, and a consensus proof, said consensus proof being generated over a symmetric hash value. Having the block allows the transaction verifier 430 to check that the transaction indeed correctly refers to the earlier transaction. Moreover, the two halves of the script in the earlier transaction output and the present transaction input may be combined and verified. For example, block obtainer 420 may request a block over the computer network 150 from a blockchain verification device. Block obtainer 420 may include in its request the transaction which is to be verified, so that the blockchain verification device can supply all needed elements of the blockchain needed for verification, e.g., an earlier block, e.g., comprising the earlier transaction, and optionally, a later block comprising a cancellation transaction.

Moreover, transaction verifier 430 is configured to verify in the block that the earlier transaction is cancelled based on the ordering of the transactions in the block. If so, the transaction is rejected. If it turns out that the ordering does not indicate a cancellation, then the block obtainer 420 may request blocks that comprise a cancellation transaction for the earlier block. Instead of the ordering, the cancelled transaction may be identified on the basis of meta information, e.g., received in or with the block.

In the various embodiments of the blockchain management device 100, blockchain verification device 500, blockchain use device 400, the communication interface may be selected from various alternatives. For example, the communication interface may be a network interface to a local or wide area network, e.g., the Internet. Alternatively, a system 180 may be implemented over other technology. For example, communication interface may be a storage interface to an internal or external data storage, an application interface (API), etc.

The blockchain management device 100, blockchain verification device 500, and/or blockchain use device 400 may have a user interface, which may include well-known elements such as one or more buttons, a keyboard, display, touch screen, etc. The user interface may be arranged for accommodating user interaction for performing, e.g., a transaction, a verification, a block management.

Storage, e.g., for storing a blockchain may be implemented as an electronic memory, say a flash memory, or magnetic memory, say hard disk or the like. Storage may comprise multiple discrete memories together making up storage. Storage may also be a temporary memory, say a RAM. In the case of a temporary storage, storage contains some means to obtain data before use, say by obtaining them over an optional network connection (not shown).

Typically, the blockchain management device 100, blockchain verification device 500, and blockchain use device 400 each comprise a microprocessor (not separately shown in FIGS. 1, 5a and 5b) which executes appropriate software stored at the device; for example, that software may have been downloaded and/or stored in a corresponding memory, e.g., a volatile memory such as RAM or a non-volatile memory such as Flash (not separately shown). Alternatively, the blockchain management device 100, blockchain verification device 500, and blockchain use device 400 devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the devices are implemented as one or more circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 6A:
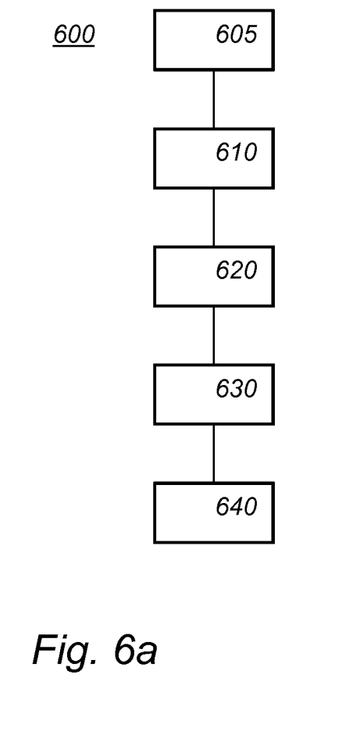

FIG. 6a schematically shows an example of an embodiment of a blockchain management method 600. Method 600 comprises receiving 605 transactions for recording in a blockchain 210, applying 610 a symmetric hash function over multiple transactions received over the communication interface thus obtaining a hash value, the symmetric hash function being arranged to produce a same hash value for the multiple transactions independent from an order in which the multiple transactions are arranged, generating 620 a consensus proof over at least the hash value, assemble 630 a new block 240 for inclusion in the blockchain, the new block comprising at least the multiple transactions 242, the consensus proof 243, and a reference to a preceding block on the blockchain 241, and distributing 640 the new block to at least one further blockchain management device 160 over the communication interface.

Figure 6B:
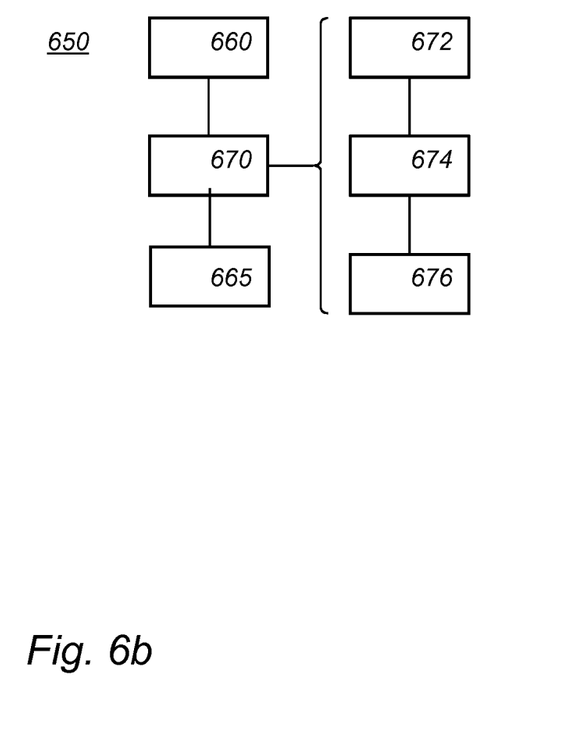

FIG. 6*b* schematically shows an example of an embodiment of a blockchain verification method 650. Method 650 comprises receiving 660 one or more blocks of a blockchain, verifying 670 the integrity of the blockchain including the one or more received blocks, said verification comprising identifying 672 a transaction in a block of the blockchain as cancelled based on the ordering of multiple transactions in the block, the block comprising a consensus proof, said consensus proof being generated over a hash value obtained by applying a symmetric hash function over the multiple transactions, the symmetric hash function being arranged to produce a same hash value for the multiple transactions independent from an order in which the multiple transactions are arranged, identifying 674 a cancellation transaction in a further block of the blockchain, determining 676 that the cancellation transaction corresponds to said cancelled transaction storing 665 the blockchain.

Figure 6C:
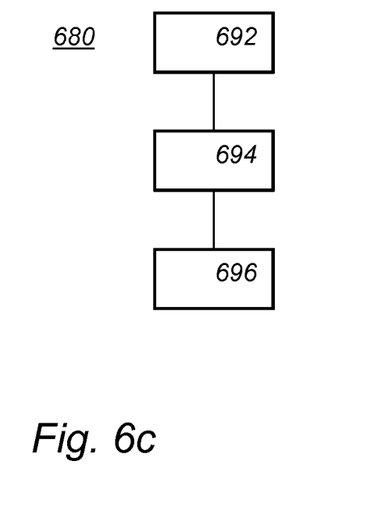

FIG. 6*c* schematically shows an example of an embodiment of a blockchain use method 680. Method 680 comprises receiving 692 a transaction, said transaction having a transaction input referring to an earlier transaction, obtaining 694 a block from a blockchain comprising said earlier transaction, wherein the block comprises multiple transactions including the earlier transaction, and a consensus proof, said consensus proof being generated over a hash value obtained by applying a symmetric hash function over the multiple transactions, the symmetric hash function being arranged to produce a same hash value for the multiple transactions independent from an order in which the multiple transactions are arranged, identifying 696 if the earlier transaction is cancelled based on the ordering of the transactions in the block.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

A method according to the invention may be executed using software, which comprises instructions for causing a processor system to perform methods 600, 650, 680. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
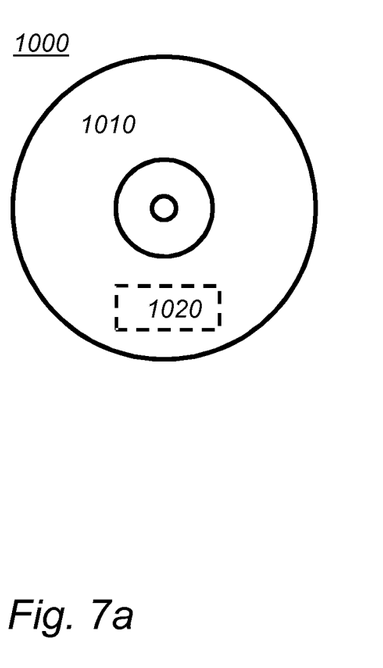

FIG. 7*a* shows a computer readable medium 1000 having a writable part 1010 comprising a computer program 1020, the computer program 1020 comprising instructions for causing a processor system to perform a method of blockchain management, verification or use according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of blockchain management, verification or use.

Figure 7B:
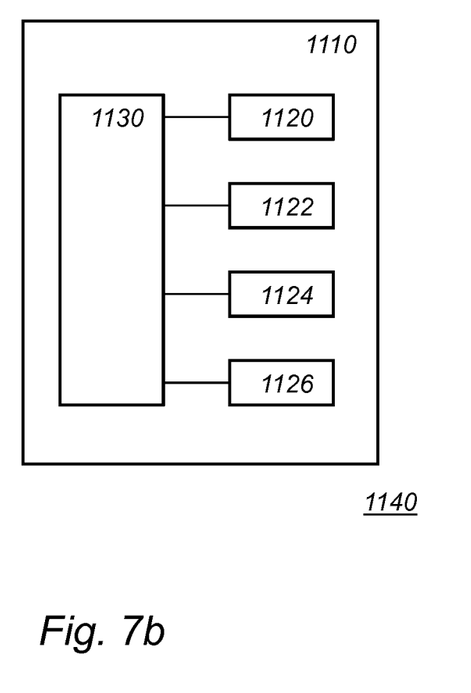

FIG. 7*b* shows in a schematic representation of a processor system 1140 according to an embodiment of a blockchain management, verification or use device. The processor system comprises one or more integrated circuits 1110. The architecture of the one or more integrated circuits 1110 is schematically shown in FIG. 7*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the blockchain management, verification or use device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A blockchain management device comprising:
    a communication interface arranged to receive transactions for recording in a blockchain, and
    a processor circuit configured to:
        apply a symmetric hash function over multiple transactions received over the communication interface thus obtaining a hash value, the symmetric hash function being arranged to produce a same hash value for the multiple transactions independent from an order in which the multiple transactions are arranged,
        generate a consensus proof over at least the hash value,
        assemble a new block for inclusion in the blockchain, the new block comprising at least the multiple transactions, the consensus proof, and a reference to a preceding block on the blockchain, and
        distribute the new block to at least one further blockchain management device over the communication interface;
    wherein the processor circuit is arranged to:
        determine that a transaction received over the communication interface is a cancellation request which requests cancellation of a transaction recorded in a block of the blockchain, said transaction being identified in the cancellation request,
        determine from the cancellation request a prior block on the blockchain which comprises the transaction which is to be cancelled, and
        generate from the prior block a replacement block, said replacement block comprising the consensus proof and the multiple transactions from the prior block, wherein the ordering of the multiple transactions in the replacement block differs from the ordering of the multiple transactions in the prior block indicating the cancellation of the transaction identified in the cancellation request;
    wherein the processor circuit is further arranged to:
        include in the new block a cancellation transaction indicating the replacement of the prior block with the replacement block, and
        distribute the replacement block to the at least one further blockchain management device over the communication interface.

2. A blockchain management device as in claim 1, wherein
    the multiple transactions comprise at least one dummy transaction in addition to the transaction identified in the cancellation request, in the ordering of the multiple transactions in the replacement block said identified transaction taking the place of the dummy transaction, and/or
    the multiple transactions comprise at least one dummy transaction in addition to the transaction identified in the cancellation request, said identified transaction being located before the dummy transaction in the ordering of the prior block and after the dummy transaction in the ordering of the replacement block thus indicating the cancellation of said identified transaction.

3. A blockchain management device as in claim 1, wherein the symmetric hash comprises computing a hash function for each of the multiple transactions obtaining multiple hashes and computing the symmetric hash by applying a symmetric function to the multiple hashes.

4. A blockchain management device as in claim 1, wherein the cancellation transaction comprises a hash of the replacement block.

5. A blockchain management device as in claim 1, wherein the transaction identified in the cancellation request has at least one transaction output, wherein the processor circuit is configured to verify that the transaction output does not correspond to a transaction input later in the blockchain.

6. A blockchain management device as in claim 1, wherein the transaction identified in the cancellation request has at least one transaction input and at least one transaction output and comprises public keys corresponding to the at least one transaction input and/or the at least one transaction output, and wherein the cancellation request comprises one or more signatures for one or more of said public keys, wherein the processor circuit is configured to verify that the one or more signatures are valid.

7. A blockchain management device as in claim 1, wherein the replacement block comprises a revision number, the consensus proof not being computed over the revision number.

8. A blockchain management device as in claim 1, wherein the replacement block comprises a further consensus proof.

9. A blockchain management device as in claim 1, wherein the consensus proof comprises a proof of work and/or signatures of one or more further blockchain management devices.

10. A blockchain management method, the method comprising:
    receiving transactions for recording in a blockchain,
    applying a symmetric hash function over multiple transactions received over the communication interface thus obtaining a hash value, the symmetric hash function being arranged to produce a same hash value for the multiple transactions independent from an order in which the multiple transactions are arranged, generating a consensus proof over at least the hash value, assembling a new block for inclusion in the blockchain, the new block comprising at least the multiple transactions, the consensus proof, and a reference to a preceding block on the blockchain, and distributing the new block to at least one further blockchain management device over the communication interface;

the method further comprising:

determining that a transaction received over the communication interface is a cancellation request which requests cancellation of a transaction recorded in a block of the blockchain, said transaction being identified in the cancellation request, determining from the cancellation request a prior block on the blockchain which comprises the transaction which is to be cancelled, and generating from the prior block a replacement block, said replacement block comprising the consensus proof and the multiple transactions from the prior block, wherein the ordering of the multiple transactions in the replacement block differs from the ordering of the multiple transactions in the prior block indicating the cancellation of the transaction identified in the cancellation request;

the method further comprising:

including in the new block a cancellation transaction indicating the replacement of the prior block with the replacement block, and distributing the replacement block to the at least one further blockchain management device over the communication interface.

* * * * *